May 28, 1957 A. GOTLIB 2,793,436
ARTIFICIAL TEETH
Filed March 20, 1953

Inventor
A. Gotlib
By Glascock Downing &c
Attys.

United States Patent Office 2,793,436
Patented May 28, 1957

2,793,436

ARTIFICIAL TEETH

Abraham Gotlib, Saint-Mande, France, assignor of fifty percent to Plastiques Dentaires & Medicaux, Paris, France, Societe a Responsabilite Limitee Application March 20, 1953, Serial No. 343,640

Claims priority, application France March 25, 1952

4 Claims. (Cl. 32—8)

This invention relates to a method of manufacturing artificial teeth which is suitable both for mass-production and for individual teeth for fitting in fixed or removable dental prosthesis, as well as tooth portions such as decay stoppings, these artificial teeth constituting a novel industrial and professional product and having a strength sufficient to withstand mastication and bite, and a resistance to abrasion sufficient to secure a lasting wear, these teeth being furthermore characterized in that those portions thereof which are intended to undergo masticatory or incisive stresses are made of a stratified or pseudo-stratified agglomerate consisting of long, very closely arranged mineral fibres of glass, quartz or the like in the form of tangled tufts, felt or fabric bound by synthetic resins. On the other hand, those teeth portions which do not undergo any mechanical wearing stresses are molded from a smooth, plain and unfilled synthetic resin forming a coating having a fine and clean appearance.

The term "stratified agglomerate" used in the preceding paragraph designates the superimposed layers formed from rectilinear, crossed or parallel fibers in fabric-like or free texture. The term "pseudo-stratified agglomerate" also used in the preceding paragraph indicates an agglomerate consisting of fibres wound or tangled in all directions, or obtained in felt form.

Up to now artificial teeth either of the mass-produced or individual type, for fixed or detachable dentures, according to the known practice, are made of porcelain, synthetic resin and seldom of metal on account of the unpleasant appearance of metal teeth. Although these materials have inherent advantageous properties, they are also characterized by serious drawbacks in this particular field of application.

Thus, porcelain teeth are very hard and have a high resistance to abrasion, but on the other hand they have poor impact resistance, compressive strength, and do not withstand rapid changes in temperature as may result from the succession of various foods and liquids with which they are brought in contact in the wearer's mouth, so that cracks frequently develop owing to volumetric changes in the plastic material of artificial dentures during the curing thereof. On the other hand, the abrading power of porcelain teeth is too high with respect to the natural teeth so that the latter are deteriorated in most cases, and besides these porcelain teeth are too hard so that shocks produced during the mastication are transmitted by these teeth to the jawbones. Moreover, they develop an unpleasant noise when they clash together.

On the other hand, synthetic resin teeth have many interesting properties if compared with porcelain teeth, but while avoiding some inconveniences of the latter as set forth hereinabove they have other drawbacks resulting from their simple plastic structure. Plastic teeth display a certain resiliency, a good resistance to shocks and changes in temperature, but they stand very poorly to wear and tear, and this combined with their insufficient hardness, considering the mastication and incisive requirements of an ideal tooth, constitutes a serious inconvenience, even if the synthetic resin from which these teeth are made has been moulded under an extremely high pressure in view of obtaining an internal texture as dense as possible.

It is the object of this invention to provide a novel method of producing strong synthetic resin teeth constituting an improvement over hitherto known plastic teeth by increasing considerably their resistance to wear and therefore extending their useful life proportionally, the teeth obtained through the application of the method of this invention having a greater hardness, thereby permitting an improved mastication and incision of the food, these improvements being such that both these wear-resistance and hardness factors are as close as possible to those of natural teeth, that is, to a lesser degree than porcelain teeth but to a higher degree than plain plastic teeth. The increase in hardness and wear resistance of the teeth obtained by the method of this invention does not reduce, but amplifies to a certain extent, their general resistance to other mechanical, physical and chemical agents or factors, while preserving a practically perfect appearance closely imitating that of natural teeth, i. e. all of the conditions required from high-quality artificial teeth which are the nearest approach to the general conditions of natural teeth.

Various suggestions have been made for a long time, of making artificial teeth and dentures as a whole by incorporating into synthetic resins, before they are moulded and allowed to set, inorganic substances in pulverulent or pellet form, such as glass, quartz, rock-crystal, mica, etc. in finely divided condition, with a view to increasing the hardness and abrasion resistance of the final plastic material, especially in the teeth chewing and cutting plane. On the other hand, a method has also been advocated beforehand which consisted in introducing into the synthetic resin, by dispersion in the polymer powders or monomer liquids intended for the moulding of teeth and dentures, an organic or inorganic fibre substance, preferably of the type having a fibre length ranging preferably from 0.04" to 0.12" and if necessary from 0.01" to ¼", with a preferred diameter ranging from 1 to 10 microns (0.00004" to 0.0004"), as a filler intended to increase their impact resistance, bending strength and tensile strength.

Indeed, practical applications of teeth and dentures made of plastic material containing fillers of this kind have never been carried out in dentistry. The reason therefor lies in the fact that instead of promoting the desired improvements these methods were rather detrimental to the strength of these teeth and dentures.

On the one hand the separate particles of these fillers are hardly kept in place on the tooth surface due to the small area through which they contact the most adherent resinous binder. As a result, these fillers, whether in pellet or short-fibre condition, are quickly eliminated not by wear but through mere tearing, followed by their absorption together with the food ingested by the wearer of these teeth, without retarding whatever the rapid and progressive wear of the plastic substance itself.

On the other hand, contrary to the desired scope, the short-fibre fibrous fillers, even in their best dispersed conditions, that is, without any felting or curdling, fail to increment the mechanical strength of dentures and teeth, and are rather detrimental in this respect; besides, they may even render them very brittle when high filler percentages are used, by dividing or cutting the internal structure of the plastic material into a multiplicity of discontinuous fragments.

It has also been suggested to make plastic teeth adapted to stand wear and tear, consisting of a body or core of plain synthetic resin secured to the chewing and cutting faces, the latter comprising hard blocks of porcelain, quartz, cement, metal, etc. However, this method too is impractical and cannot be used extensively in dentistry.

Besides, this last-mentioned method is very slow to carry out and this is very inconvenient in the mass-production of synthetic teeth requiring the previous melting and shaping to very accurate dimensions of blocks of hard material intended to take the exact contours of the cavities formed in metal moulds for moulding the plastic portions, otherwise these blocks will be crushed or crumbled under the high pressure exerted by the other mould half, in case of wrong bearing, except when unpleasant-looking metal blocks are used instead of the aforesaid hard blocks.

Furthermore, when teeth of this type (i. e. comprising porcelain, cement or quartz blocks) which also have an unpleasant appearance, are used, they crack like porcelain teeth and moreover the junction edges between blocks made of such materials and the plastic portions, which must be very sharp, disintegrate very quickly under the chewing and cutting stresses and then display very visible separation lines and chinks, which are a source of discomfort and appear unpleasantly between the teeth-forming elements.

Now, contrary to the above-mentioned methods, the present invention makes it possible to manufacture in a practical and rapid manner artificial teeth of high strength and toughness, having a very good resistance to abrasion and excellent chewing and cutting properties, without any of the aforementioned inconveniences.

Various possible combinations and characteristic features of the invention will appear as the following description of stratified or pseudo-stratified teeth, as well as of their method of manufacture proceeds, with reference to the accompanying drawing showing diagrammatically by way of example a few forms of embodiment of the invention. In the drawing.

Figure 1:
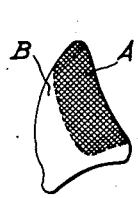
Figure 1 shows in longitudinal section the principle of an artificial tooth made in accordance with the teachings of this invention.
Figure 2:
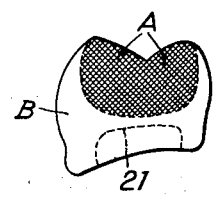
Figure 2 shows in longitudinal section the principle of an artificial back tooth according to this invention.
Figure 3:
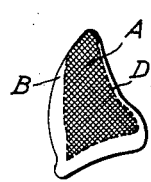
Figure 3 illustrates in longitudinal section a tooth having a plain stratified or pseudo-stratified core.
Figure 4:
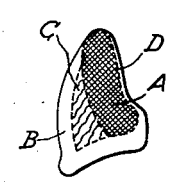
Figure 4 illustrates in longitudinal section a tooth having a compound stratified or pseudo-stratified core.
Figure 5:
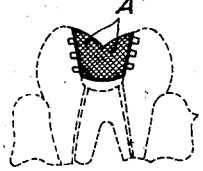
Figure 5 is a fragmentary sectional view showing the stopping of a tooth decay by means of a stratified tooth element.
Figure 6:
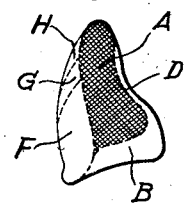
Figure 6 is a longitudinal section showing a solid tooth according to the invention, of the vestibular, three-colour two-graduation type.
Figure 7:
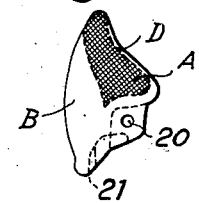
Figure 7 is a longitudinal section of another tooth made in accordance with the method of the invention and provided with a retaining orifice and notch.
Figure 8:
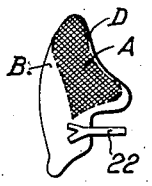
Figure 8 illustrates in longitudinal section a metal-studded tooth.
Figure 9:
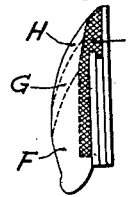
Figure 9 shows in longitudinal section another tooth of the so-called facet and slide type, adapted to be cemented on a slide-forming metal plate.
Figure 10:
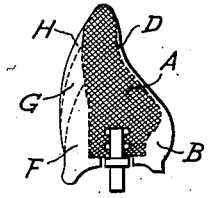
Figure 10 is another longitudinal section showing a so-called pivot-stud tooth, intended to be cemented on a metal pivot or having embedded therein a metal pivot stud.
Figure 11:
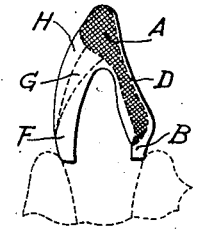
Figure 11 illustrates in longitudinal section a tooth crown also made in accordance with this invention and adapted to be cemented on the stump of a natural tooth.

It is the essential object of this invention to provide means for mass-producing artificial teeth moulded in metal moulding units, and also separate teeth, teeth-crowns and bridges moulded from plaster or cement moulds. These teeth may have any desired shapes, colours and sizes. They may be substituted for front teeth, as shown in Figs. 1, 3, 4 and 6 to 11, or back teeth as shown in Fig. 2.

The teeth made according to the invention may be manufactured without any retaining means, as illustrated in Figs. 1, 2, 3, 4 and 6, or provided with one or more retaining means such as the orifice 20 and notch 21 (Fig. 7), or one or more metal studs as shown at 22 (Fig. 8), or any other metallic or non-metallic retaining means, such as rings, rods, counter-plates, notches, channels, etc. These teeth may be made either hollow or solid, in crown form (Fig. 11) or adapted to receive internally a fixed or removable magnetized block or any other suitable metal reinforcement.

These stratified or pseudo-stratified teeth consist, on the one hand, of a small "abrasion-resisting" mass or layer A positioned to resist chewing and incisive stresses, that is at the lingual faces and incisive edges of the front teeth, and at the triturating faces of the back teeth, this abrasion-resisting mass or layer consisting of the intimate and compressed agglomeration of long inorganic fibres of glass, quartz, or the like, the binder consisting of a hard and adherent synthetic resin and, on the other hand, of a covering layer or "appearance" coating B positioned at places where no mechanical stresses are applied, this layer or coating B consisting of plain resin, without any filler, especially on the vestibular side and preferably at the teeth heels. Moreover, these teeth may also comprise a little stratified inner layer C consisting of more widely nested fibres. The use of plain, unfilled resin in the "appearance" layer on the vestibular side makes it possible to obtain a close imitation of natural teeth by using a plurality of layers having different colours and superimposed in progressively increasing or decreasing manner, for example by providing two or— still better—three layers corresponding to the neck, dentine and enamel of natural teeth, as shown at F, G and H respectively in Figs. 6, 9, 10 and 11 of the drawing.

Portions or layers A may even be coated initially with a thin film of plain resin D intended to improve the commercial appearance of the new teeth, this additional film wearing out very rapidly when the tooth is worn.

The inorganic fibers of glass, quartz or the like, to be used in the abrasion-resisting layers A of the teeth in accordance with this invention, will preferably have a diameter of the order of 0.00004" to 0.0008" and a relatively great length, preferably from one inch to one foot or more but at any rate above ⅜", with a low content of fibres shorter than this minimum length. These inorganic fibres should have a great flexibility and a high tensile strength to avoid their breaking into fine needles constituting short fibres when the moulding pressure is applied thereto. Most of these fibres must therefore be rather long so as to form together a tufty or felty entanglement, or even a cross-fibre cloth made of multiple, superimposed fibre layers.

The fibre agglomerate utilized to form the abrasion-resisting layer A must therefore be very intimate, the fibres being as close as possible to one another and as consistent with their compressibility in the teeth-shaping cavities of the mould. The fibre content must be at least 5% by weight of the stratified or pseudo-stratified agglomerate, and preferably from 10% to 50% (and even more if possible) by weight of the agglomerate, which corresponds to about 5% to 22% by volume, considering the specific gravity of glass or quartz fibres (about 2.5) and of the resinous binder (about 1.2).

In principle, according to this invention, the fibres should be so compressed and close that they touch one another in many points, and that the attack resulting from masticatory and incisive movements will not cause any rapid wear of the resinous binder located between the fibres. It is necessary that when these teeth engage the opposite teeth or food elements, in the plane of trituration and cutting, the edges or projections of very small inorganic fibres will first be brought into engagement therewith, and that the resinous binder will undergo a progressive wear only in the second place (between the fibres and in depth), so that the fibre projections flush with the tooth surface may wear or tear out by themselves in the long run. This does not occur easily with long fibres as these are strongly held in depth, contrary to the short-fibre (i. e. of from 0.04" to ⅜") method previously described.

As a result, in the stratified teeth according to the invention and as compared with plain-resin teeth or teeth containing pulverulent or short-fibre fillers, the rate of wear is considerably slower and the degree of masticatory and incisive efficiency is materially higher, with respect both to the individual tensile strength and resistance to wear, as well as to the hardness, when long fibres of glass, quartz or the like are used, for a given unit area of plastic material. These properties are extremely good in relation to the small diameter of the glass fibres, for example, of which the tensile strength is extremely high and well-known in the manufacture of glass-resin stratified compounds, this tensile strength increasing inversely as the diameter of the glass filaments, according to a law having a hyperbolic pattern such as 1,140 p. s. i. with a 0.008" diameter, 2,418 p. s. i. with a 0.0003" diameter, 3,415 p. s. i. with a 0.0002" diameter, etc.

The agglomerated mass of long glass or quartz fibres thus forming the abrasion-resisting portions of the tooth according to this invention has not only a very good abrasion-resisting property which is materially higher than that of the hardest plain plastic material hitherto known and utilized as a binder for the agglomerate, but also a remarkable impact resistance and tensile strength, it being known that for example in industrial mouldings made from long glass fibres this strength may attain and even exceed, in the case of a well-moulded mass of stratified-glass agglomerate, 356 to 425 p. s. i., that is, an increase of from 4 to 6 times in the strength of the same resin in plain form used as a binder for the stratified agglomerate.

The well-known principle of this extraordinary strength cannot be carried out in the practice unless very long and unbroken fibres are used, in the absence of any short and broken fibres as the latter are most likely to reduce this property. The abrasion-resisting agglomerates according to this invention are also based on this principle of using long and unbroken fibres forming a real stratified or pseudo-stratified structure of inorganic fibres closely assembled to one another and engaged deeply and in a sinuous manner in the plastic tooth body. The adhesive power of the binder will then act over a large surface of contact with the long fibres, in comparison with their very small diameter, so that this desired mechanical property can be attained through the individual toughness of the inorganic filaments tightly held in depth and acting together while supporting one another mutually to contribute to the general strength of the mass, contrary to the reduced contact area of short fibres dispersed as a filler in known and hitherto advocated methods for moulding artificial teeth and dentures, so that it can be said that these formed methods, far from carrying out the purpose for which they were designed, lead instead to exactly opposite results and effects.

According to a preferred but non-limiting practical embodiment of the teeth made in accordance with this invention, the most suitable fibres for use in the manufacture of standardized and individual teeth, crowns and bridges are the long, flexible and silky glass fibres obtained by a drawing process with an adequate batching, these fibres having preferably a diameter of the order of from 0.0002" to 0.0004" and being used in the moulding operation in the form of tangled tufts made of continuous and wound fibres.

These fibres must be compressible from this initial tuft condition without breaking, irrespective of the pressure exerted during the moulding operation, and such as to readily take the shape of the most sinuous and irregular cavity contours in the mould.

Regarding the dimension of and the volume occupied by these fibres in given mould cavities, the finer the fibres, the greater the free volume occupied by the fibre tuft or fabric in the mould cavities with respect to their weight, and therefore the greater the intervals to be filled by the resinous binder between the fibres. In other words, the smaller the fibre diameters, the lower the fibre weight in the agglomerate of the given cavity volume even under the highest pressure consistent with the metal mould used in the manufacture of teeth.

In addition, moulding experience in the field of stratified or pseudo-stratified teeth according to the invention teaches that the proportions of long glass fibres in the abrasion-resisting agglomerate are practically but extremely variable, with wide differences, these proportions depending essentially from many factors such as the conditions and degree of fineness and flexibility of the glass fibres, the type of synthetic resin selected for the binder and its fluidity, the practical choice of the teeth moulding system being dependent upon the cavity shapes to be reproduced and the setting coefficient of contraction of the resinous binder utilized.

According to this invention the binder of the abrasion-resisting layer will preferably consist of a resin or a mixture of resins of the same group or kind as the plastic material of which the other tooth portions or layers are made, this condition however being not compulsory.

Preferably also, the stratified or pseudo-stratified agglomerate will be made from a fluid and adhesive resinous binder adapted easily to penetrate throughout the entanglement of long fibres and to be regularly or uniformly distributed therebetween. The other tooth portions, notably the plain resin appearance layer, may be obtained by using either a thermosetting paste, or a thermoplastic powder, or a polymer powder soaked with liquid monomer to form a polymerizing paste after the final moulding.

As a rule, all the parts of teeth made in accordance with the present invention can be obtained by cold or hot moulding as the synthetic resins utilized for this purpose may consist either of thermoplastic or thermosetting compositions or the like, to which suitable accelerating catalysts are added in view of their hot or cold hardening, or polymerisable polyesters either plain or in admixture with condensation resins or mixtures of these resins, or mixtures of substances taken from these different groups and liable to coalesce homogeneously with one another. These resins may be used either in liquid state as a monomer or the like, or in the pasty condition developed by polymerization or partial condensation, or in admixture or solution of polymer or the like, with or within monomers or the like. Regarding more particularly the binder for the fibre agglomerate, a polymer solution in a volatile solvent or mixture of volatile solvents can be used, which solvent or mixture of solvents is subsequently distilled off by evaporation before or during the moulding of the agglomerate, the polymer residue remaining entrapped in the inter-fibre intervals after this evaporation, and acting as a hardened binder therefor.

The only condition laid down to these synthetic resins is that they possess to a sufficient extent and even to the maximum degree the following properties: fluidity, fibre penetration, elimination of resin excess under the moulding pressure, adherence to the inorganic fibres in the final condition, hardness and resistance to both mechanical and chemical agents and factors in all tooth portions during their actual use, and possibility of receiving the desired colour shades to imitate natural teeth.

To improve the adherence of the resinous binder to the glass fibres the latter must be scoured from the oily products used during the previoush filament-drawing operation. For this purpose any known thermal or chemical treatment may be applied to the fibres.

The teeth according to this invention may be moulded in a single operation, i. e. by subjecting superimposed layers of the fibre agglomerate and plain resin coating layers to a single moulding step and to either a single hot curing operation or cold setting operation. However, in view of improving the compression of the inorganic fibres and facilitating the manufacture of certain types of teeth as well as the obtaining of the desired colour shades, parts of these teeth may be moulded either separately one after another or in superposed relationship by effecting separately a partial or complete hardening of each part, and eventually by welding these parts together.

In the case of mass-production of given series of teeth it is preferable and quicker to first mould the agglomerate of inorganic fibres with or without partial or complete curing or setting in the same metal moulds but with special counterparts (intermediate counterparts), then add the complementary resin by moulding from the precast teeth elements, this complementary resin being in the form of a paste of powder soaked with monomer, or a thermoplastic powder, so as to finish the required shape, and notably the "appearance" coating layer of plain resin in several colour graduations, by definitely compressing the teeth against the normal counterparts of the moulds before effecting the ultimate hardening of the assembly.

The fluid resinous binder consisting of a polymerizable or condensable monomer may be introduced or incorporated inbetween the inorganic fibres through different processes: by dip or spray soaking the fibres with the fluid or moderately viscous liquid monomer; by forcing the same liquid into adequate moulds; by vacuum suction, with or without the initial presence of a polymerized powder in very finely divided condition between the fibres; by mixing the fibres with polymer powders soaked with monomer liquids forming a mouldable paste to be prepared beforehand and subsequently introduced into the moulds in view of the compression-moulding step.

When fibres soaked with the fluid binder, or fibres added to the binder in pasty form are compression-moulded, the maximum amount of excess resinous binder will be eliminated so that the fibres will eventually lie as close as possible to one another. As a rule, the entanglement of long inorganic fibres is rather static in that these fibres have a marked tendency to gather and be compressed on the spot without moving laterally to an appreciable degree towards the peripheral burr, whilst the resinous binder proper, due to its adequate plasticity or fluidity, will tend to flow outside by itself.

The abrasion-resisting layers may be coloured by using either coloured inorganic fibres or colourless fibres to which a subsequent external colouring treatment is applied; this latter process is preferred in that it affords a greater range of shades. This external colouring of the inorganic fibres may be effected in several ways, e. g. by using a previously coloured fluid binder, or introducing colouring and opaquing pigments between the fibres, before the moulding step, or very fine polymer powders already coloured and made opaque at different degrees, the fibres being subsequently soaked with a colourless liquid monomer. This last process is more advantageous on account of the great ease with which an extensive range of shades can be obtained to imitate natural teeth.

Still within the scope of this invention the stratified or pseudo-stratified tooth agglomerate should be as thick as possible while affording thin or intermediate parts in view of securing the desired aesthetic effects which would be prevalent in certain cases with respect to the principles of durability. However, it is preferable to compensate as much as possible the thickness of the tooth-forming layers (considered according to a horizontal section of the tooth) in order to provide on the vestibulary face an "appearance" resin layer of a thickness sufficient to afford colouring effects comprising two or three colours gradually superposed in feather-edge fashion so as to give well-blended shades imitating the neck, the dentine and possibly the enamel of natural teeth. On the other hand it should be remembered that the stratified or pseudo-stratified layer must be thick enough to permit the grinding of the teeth for either fitting a stopping, or reducing the dimensions of dentures when fitting same, especially at the incisive edge of the front teeth, while leaving at the critical places the minimum thickness required for the abrasion resisting property of the teeth, as well as an additional thickness or height intended to secure a convenient durability of these teeth, considering their slow but unavoidable wear, which is normal since even natural teeth wear out in the long run.

Still in accordance with the present invention, teeth heels may be advantageously made of plain thermoplastic resin unfilled with inorganic fibres when teeth are to be used by welding on detachable or fixed synthetic resin dentures generally formed from polymerizable paste obtained by mixing polymer powder with the methyl-methacrylate liquid monomer (methacrylic acid methylester). Thus, the stratified teeth according to this invention will be more solidly welded to the plastic base or parts of these dentures. In those cases where it is impossible to form similar heels of non-stratified thermoplastic resin on these teeth, it will be useful to design the latter with mechanical retaining means such as notches, holes, etc. or metal studs.

If thermosetting resins are used in the manufacture of stratified teeth both in the fibre agglomerate binder and in the vestibular "appearance" coating, the heels of these teeth may be made of polymerizable thermoplastic resin to be selected amongst the resins compatible in the monomer condition with the thermosetting resin composition of the general tooth body.

According to the present invention the polymerized plastic material can be given a more close-grained texture, when thermoplastic resin is used in the mass-production of stratified teeth by means of metal moulds, in order to compensate the general contraction in the mass as caused by the volumetric contraction of the monomer in the moulded paste during its polymerization (this contraction being an important factor in certain resins; thus, in methyl methacrylate monomer its value is of the order of 20%). This closing may be effected, according to the present invention, by applying a thermoplastic overcompression to the previously polymerized teeth, thereby combining the advantages of both moulding systems which up to now were used only separately in the manufacture of artificial teeth in series (from polymerizable paste, or from the polymer powder alone moulded by thermoplastic pressure).

According to the invention the final moulding operation, wherein the teeth cavities are filled, will be effected with a slight raising of the upper mould block or portion, calculated from the approximate teeth volume and ranging from 0.004" to 0.02" in thickness, by interposing between the two mould blocks and endwise thereof a pair of metal liners of adequate thickness and forming abutments for the mould.

The polymerization of teeth thickened by this mould raising will be carried out firstly at a temperature consistent with the resin used (for example 100° C. for methyl methacrylate, or any other adequate temperature value for a different resin composition). Then the mould will be quickly heated in a heating chamber or by immersing same into a suitable liquid, or between heated plates, to a temperature sufficiently beyond the softening point of the plastic material polymerized in the teeth (for example 110° to 140° C. in the case of methyl methacrylate or its copolymer, or to any other suitable temperature for a different resin composition). The metal liners will be quickly removed without allowing the mould to be opened by the swelling of the teeth softened within the mould, and the overheated mould will be definitely compressed home under a high pressure of the order of 1,400 to 2,150 p. s. i. by means of 20 to 30-ton presses, until the mould is closed completely, and finally the mould is cooled under pressure to a temperature sufficient to permit the opening thereof without any risk of deteriorating the teeth.

By way of indication and without limiting the scope of this invention, the teeth made in accordance therewith may be moulded from the following substances either separately or in admixture with their suitable accelerating catalysts in view of hot or cold setting: methacrylic, acrylic, styrolic, vinylic, cellulosic derivatives, glyptal resins, allyl derivatives, phenoplasts, aminoplasts, melamine and like derivatives from the thermoplastic and thermosetting group, originally in colourless condition, either transparent, colourless or yellowish, or translucent or opaque, whitish or yellowish.

What I claim is:

1. Artificial teeth having a high resistance to abrasion, comprising masticatory and incisive portions consisting of an intimate agglomerate of synthetic resin and tangled glass fibres of a length ranging from ⅜" to one foot and more, with only a low percentage of shorter fibres, at least one layer of synthetic, unfilled resin molded about said agglomerate on the labial slide and lingual side of the teeth, and at least one color in said layers to give the appearance of natural teeth.

2. Artificial teeth having a high resistance to abrasion, adapted to be incorporated in dentures made of a polymerisable paste containing a mixture of polymer in powder form and a liquid monomer, said teeth comprising masticatory and incisive portions consisting of an intimate agglomerate of tangled glass fibres and resin, said resin being selected from the group of thermosetting and thermoplastic resins, said teeth portions containing a great majority of fibres of a length over ⅜", at least one layer of a resin welded to and molded about, said masticatory and incisive portions, and an unfilled heel portion made of a resin selected from the group of polymerisable resins and thermoplastic resins, said selected resin being on the one hand welded on said portions and layers by compatibility in its condition, and on the other hand weldable on said denture through the action of the monomer liquid in said denture paste.

3. Artificial teeth having a high resistance to abrasion, comprising masticatory and incisive portions consisting of an intimate agglomerate of synthetic resin and tangled glass fibres of a length ranging from ⅜" to one foot and more, with only a low content of shorter fibres, at least one layer of unfilled synthetic resin molded about said agglomerate on the labial and lingual sides of the teeth, and mechanical retaining means for securing said teeth on stationary dental prosthesis members.

4. Artificial teeth having a high resistance to abrasion, comprising masticatory and incisive portions consisting of an intimate agglomerate of synthetic resin and tangled glass fibres of a length ranging from ⅜" to one foot and more, with only a low content of shorter fibres, at least one layer of synthetic, unfilled resin molded about said agglomerate on the labial and lingual sides of said teeth, cavities being provided in said teeth for receiving magnetized blocks to secure the self-repulsion effect in complete dentures.

References Cited in the file of this patent

UNITED STATES PATENTS

| | | |
|---|---|---|
| 2,345,305 | Thornton | Mar. 28, 1944 |
| 2,477,268 | Saffir | July 26, 1949 |
| 2,514,076 | Kelly | July 4, 1950 |